May 24, 1966     E. R. DE VRIES     3,253,146

FLUORESCENT MARKER PIGMENT FOR ROADWAYS

Filed Aug. 16, 1962

INVENTOR
Eduard R. de Vries

BY    *Karl W. Flocks*
ATTORNEY

United States Patent Office 3,253,146
Patented May 24, 1966

3,253,146
FLUORESCENT MARKER PIGMENT FOR ROADWAYS
Eduard R. de Vries, Huntingdon, Pa., assignor to Prismo Safety Corporation, Huntingdon, Pa., a corporation of Pennsylvania
Filed Aug. 16, 1962, Ser. No. 217,431
19 Claims. (Cl. 250—71)

The present invention relates to reflective markings and more particularly to a reflective marking which gives a bright colored light return during daylight as well as a colored return at night.

It has heretofore been proposed to utilize fluorescent pigments in paints to yield brilliant daylight colors. It has been found, however, that even relatively small amounts of hiding pigments can almost completely kill the fluorescent effect. It has also been found that coatings containing these fluorescent pigments are hardly visible under artificial light, such as from automobiles, even though they have excellent daytime visibility. Further, since the daylight fluorescent pigments are transparent, the color and structure of the base is very important for the achievement of maximum fluorescent brightness. It has been customary heretofore to utilize such fluorescent pigments in a transparent binder on a white base to give maximum brightness.

It is an object of the present invention to provide an improved system of marking utilizing fluorescent pigments.

A further object of the present invention is to provide an improved system of marking roadways and signs which yield a brilliant daylight fluorescence and a colored return at night.

A still further object of the present invention is to provide a system which includes both fluorescent pigment and a hiding pigment wherein the hiding pigments will not kill the daylight fluorescent effect.

Figure 1:
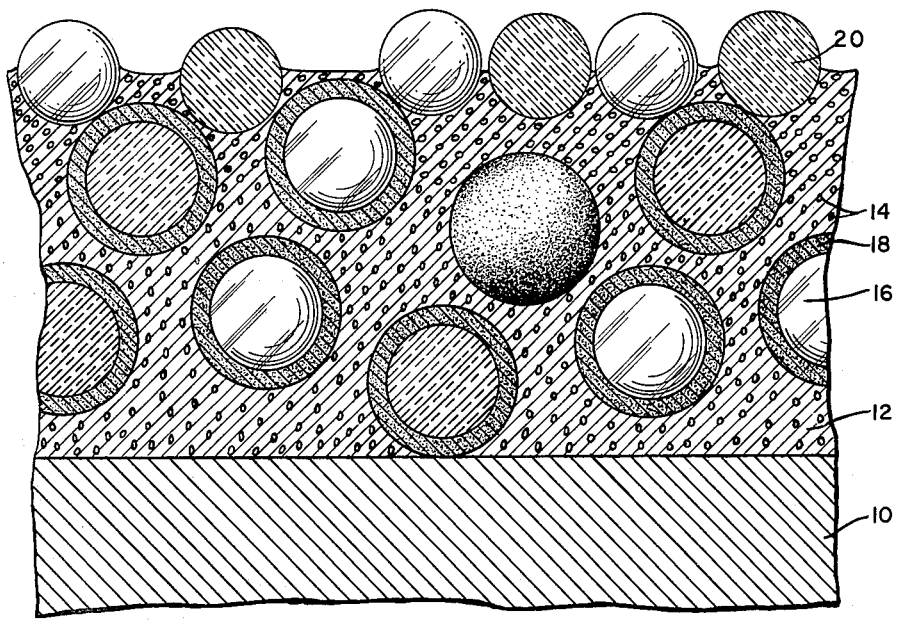
Figure 2:
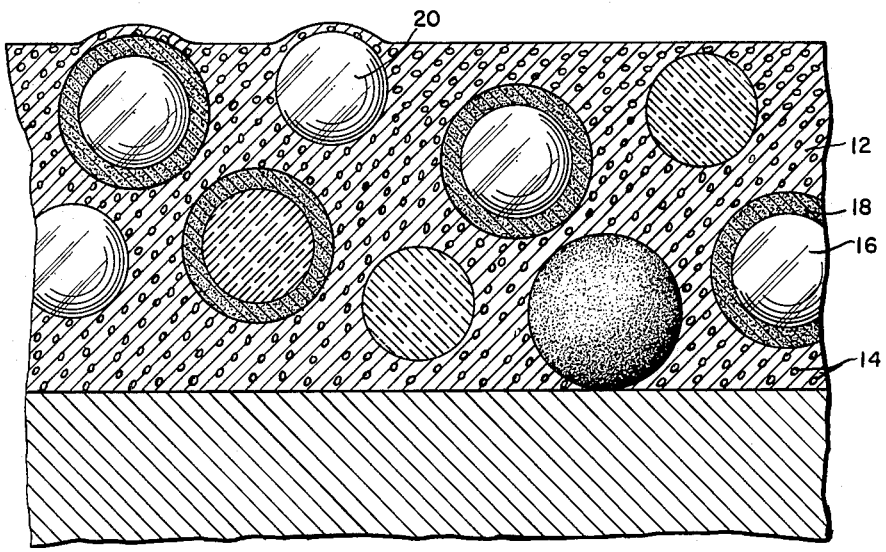

Other objects and the nature and advantages of the instant invention will be apparent from the following description taken in conjunction with the accompanying drawings, wherein:

FIG. 1 is a magnified diagrammatic cross-sectional view of a system in accordance with the present invention; and FIG. 2 is a similar view showing a modified form of the invention.

In accordance with the present invention an improved marker is obtained by coating the usual glass beads used in traffic marking with a relatively thin coating of a pigmented resin composition as shown in the drawings. After curing of the resin composition and drying until the coated beads are free flowing, the coated beads are incorporated into a transparent or semi-transparent binder containing fluorescent pigments. The resulting composition is applied onto a base and uncoated glass beads are dropped onto the surface thereof while the composition is still tacky.

The resulting marker is so constituted that the fluorescent pigment particles and the pigment particles in the coating on the glass beads are not mixed so that the fluorescent effect is not killed, and the pigmented beads act as the opaque pigmented built-in background for achieving the maximum fluorescent and retro-reflective effect. This eliminates the necessity for a separately applied opaque pigmented background heretofore required which would be impractical for use in traffic line application. Further, the fluorescent pigments have limited durability on exposure to daylight. In the present system, the fluorescent material beneath the opaque beads is protected from the daylight until it is uncovered by continuous abrasion of the traffic on the line.

The coated glass beads which may have a diameter varying from ½ to 50 mils are preferably coated with a pigmented curing catalyzed epoxy resin system. The hiding pigment may be white or colored or a mixture thereof. In a specific example, the pigment can be chrome yellow to give a yellow coloration to the line at night.

For example, an opaque epoxy resin coating for the beads may be:

| | Parts by weight |
|---|---|
| Epoxy resin | 100 |
| Curing agent (polyamide) | 50 |
| Chrome yellow pigment | 50 |
| Diatomaceous earth extender | 25 |
| Methylene chloride | 50–100 |

The glass beads are coated with the epoxy resin composition by spraying and then drying under heat to cure the resin and yield free flowing coated beads. Other methods of coating may be utilized and the use of spray drying thru a heated zone may be advantageous. The preparation of these coated glass beads is the subject of applicant's copending application Serial No. 217,436 filed August 16, 1962.

The dry coated beads are then mixed into a transparent or semi-transparent binder containing the fluorescent pigment particles. A typical formulation may be:

| | Parts by weight |
|---|---|
| Binder (solids) | 1 |
| Fluorescent pigment particles | 1.5 |
| Coated glass beads | 1 |

The resulting composition is then applied onto a base by spraying, brushing, dipping or otherwise coating. While the composition is still tacky uncoated glass beads are applied to the upper surface.

The glass beads may be coated with pigmented resin compositions other than epoxy resins. For example, the coating resin may be a pigmented polyester resin composition, thermosetting polystyrene resins, and other thermosetting resins which solidify rapidly. The coating on the glass beads must be completely insoluble in the binder with which it is mixed.

The binder may include as the vhicle natural resins and some of their glycerol esters; synthetic resins may also be used as glycerol phthalate, ethylene glycol phthalate, pentaerythritol phthalate, vinyl acetate polymers, phenol-formaldehyde condensation products, modified phenol-formaldehyde, formaldehyde resins, para coumarone-indene (cumar) resin, chlorinated diphenyl resin, and cyclo hexanone formaldehyde resin. Drying and semi-drying oils may also be incorporated.

The fluorescent pigment particles are finely powdered brilliant organic pigments which fluoresce brilliantly under ultra-violet or daylight illumination. These pigments have no after glow. The average particle size is 3.2–3.3 microns and have a refractive index of 1.61–1.63. The fluorescent pigments may be pink, orange, green, red or yellow and are available commercially from Lawter Chemicals, Inc., Chicago, Ill. These fluorescent pigment particles are apparently made in accordance with methods such as are disclosed in U.S. Patents 2,498,592 and 2,895,917.

When the red fluorescent pigment is used in combination with chrome yellow pigmented glass beads, a paint is obtained which gives a bright orange light return in daylight and a yellow return at night.

Referring to FIG. 1, a base 10 is shown, such as a roadway, the upper surface of which is coated with the binder layer 12 containing a plurality of fluorescent pigment particles 14 and a plurality of coated glass beads 16. Each glass bead is completely covered with a coating material 18. Uncoated glass beads 20 are applied to the surface of the marker and are partially embedded therein.

FIG. 2 shows a similar marker except that a plurality of uncoated glass beads 20 are also included premixed in the binder layer 12 along with the coated glass beads 16 and the fluorescent pigment particles 14.

In accordance with the present system, the fluorescent pigment particles are not mixed with or in contact with the hiding pigment and thus the fluorescent effect is not lost. Furthermore, with this system the opaque beads form a built-in background for the fluorescent pigments and eliminate the necessity for a separately applied opaque base coat. The paint can be applied to any surface such as a roadway or a sign base without necessity for a base coat. The opaque beads also act as the reflective surface beneath the uncoated beads to give reflectivity at night. The light focuses through the transparent glass beads onto the opaque coated beads and is reflected back to yield retro-reflectivity at night.

For continuing night reflectivity, uncoated glass beads should be premixed with the coated beads as shown in FIG. 2. Uncoated glass beads can also be dropped onto the marker shown in FIG. 2 for immediate night reflectivity.

The proportions of the ingredients can be varied over wide ranges as follows:

| | Parts by weight |
|---|---|
| Binder | 1–5 |
| Fluorescent pigment particles | 1–5 |
| Coated glass beads | 1–5 |

The viscosity of the composition may be adjusted as desired by the addition of a solvent such as mineral spirits, naphtha, and the like so long as they do not dissolve the coating from around the glass beads. Small amounts of transparent extenders may be added to the binder, such as silica gel, talc, calcium carbonate, etc. These extenders impart light diffusing and surface matting properties to the coating. This reduces the drying time and increases the brilliance of the coating when it is viewed from an oblique angle.

For retro-reflectivity, a certain proportion of uncoated clear glass beads can be premixed with the coated opaque beads as shown in FIG. 2. From 0–90% of the beads can be uncoated, whereas from 10–100% can be coated.

The epoxy resins employed in accordance with the present invention are commonly referred to as poly glycidyl ethers of polyhydric alcohols and glycidyl ethers of bis-phenols, characterized by the following general formula:

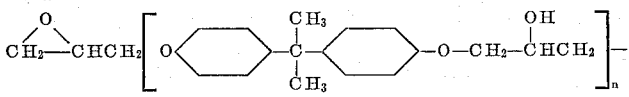 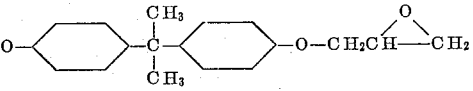

wherein $n$ represents the extent of copolymerization and varies between 0 and 10 indicating molecular weights of 400 to approximately 8000. These products contain both epoxide and hydroxyl groups capable of further reaction. It is the combination of these groups with the curing agent that results in the cured resin systems. Various amines, such as ethylene diamine, triethylene tetramine, dimethyl amino methyl phenol, tri (dimethyl amino methyl) phenol, diamino diphenyl sulfone, metaphenylene diamine, and diethyl aminopropylamine, acid anhydrides, organic sulfonic acids, dibasic acids and resins, such as polyamides, are typical curing agents.

The epoxy resins are commercially sold by Shell Chemical Corp. under the tradenames of Epons. Epon 828, for example, has a melting point of 8–12° C. and an epoxide equivalent ranging between 190–210. By the epoxide equivalency is meant the average number of 1,2-epoxy groups contained in the average molecule. It is expressed in the trade as the grams of the polymeric material or resin containing one gram equivalent of epoxide.

It should be understood that the epoxy resins suitable for use in this invention are not limited to those described above. Any resinous material containing reactive epoxy groups whether aliphatic or aromatic, may be used so long as the material will cure in the presence of curing agents to a solid condition. For example, a dicyclodiepoxy carboxylate resin may be used which is sold by Union Carbide and Carbon Co. as Epoxide 201.

Pigment may be added to the binder to impart reflection to the composition as well as color and opacity. To produce a white reflecting composition, it is necessary to have a prime pigment, such as rutile titanium dioxide, to furnish the necessary whiteness and opacity. In place of the rutile titanium dioxide, anatase titanium dioxide may be substituted. Other pigments that may be used for white and colored compositions are as follows: aluminum oxide, iron oxide, silicon carbide, antimony oxides, lead oxide, lead chromates, zinc chromates, cadmium pigments, siennas, umbers, inorganic or organic reds, chrome yellows, chrome oranges, chrome greens, etc. The pigments can be extended with barium sulphate, calcium sulphate, magnesium silicate, zinc oxides, zinc sulphide, normal or high strength lithopones, diatomaceous silica, amorphous and crystalline silica, micaceous materials, barium sulphate, whiting, wollastonite pumices, calcium carbonate, clay, talc, perlite, asbestos, granular marble, sand, glass cullet, and other natural or manufactured granular materials.

Another example of a suitable composition for coating the glass beads is as follows:

| | Parts by weight |
|---|---|
| Epoxy resin (Epotuf 6140) | 800 |
| Phenylglycidyl ether | 150 |
| Titanium dioxide | 200 |
| Asbestine | 400 |
| Boron trifluoride amine complex | 5 |

Another suitable composition for coating the glass beads is:

| | Parts by weight |
|---|---|
| Polyester resin composition | 100 |
| Chrome yellow | 30 |
| Benzoyl peroxide | 5 |

A somewhat different system can be utilized wherein the glass beads are coated with a phosphorescent or fluorescent opaque pigment such as zinc sulfide, strontium sulfide and the like. It is also contemplated to use a system wherein the pigment on the beads is an activator for the fluorescent pigment in the binder system. As activators, radio active substances can be used to activate light return in the visible range from the other pigment.

It will be obvious to those skilled in the art that various changes may be made without departing from the spirit of the invention and therefore the invention is not limited to what is shown in the drawings and described in the specification, but only as indicated in the appended claims.

What is claimed is:

1. A marking composition for both day and night use comprising a transparent binder containing a plurality of daylight fluorescent pigment particles and a plurality of small opaque coated glass beads therein said coated glass beads having a relatively thin coating of a cured resin having a reflective pigment therein which renders the beads opaque and reflecting.

2. A composition in accordance with claim 1, which also contains a plurality of small uncoated glass beads therein.

3. A composition in accordance with claim 1 wherein said fluorescent pigment particles return an orange color in daylight and the pigment in the coated glass beads is yellow thereby reflecting a yellow return at night.

4. A composition in accordance with claim 1 wherein said glass beads have a cured coating thereon of a pigmented epoxy resin composition.

5. A composition in accordance with claim 1 wherein said glass beads have a cured coating thereon of a chrome yellow pigmented epoxy resin composition.

6. A marker adopted for highway marking comprising a base surface having a layer of marking composition thereon, said marking composition comprising a solidified transparent binder containing a plurality of daylight fluorescent pigment particles and a plurality of small opaque coated glass beads embedded therein, said coated glass beads having a relatively thin coating of a cured resin having a reflective pigment therein which renders the beads opaque and reflecting.

7. A marker in accordance with claim 6 wherein the composition also contains a plurality of small uncoated glass beads therein.

8. A marker in accordance with claim 6 wherein said fluorescent pigment particles return an orange color in daylight and the pigment in the coated glass beads is yellow thereby reflecting a yellow return at night.

9. A marker in accordance with claim 6 wherein said glass beads have a cured coating thereon of a pigmented epoxy resin composition.

10. A marker in accordance with claim 6 wherein said glass beads have a cured coating thereon of a chrome yellow pigmented epoxy resin composition.

11. A marker in accordance with claim 6 wherein a plurality of small uncoated glass beads are partially embedded in the upper surface thereof.

12. A marker in accordance with claim 7 wherein a plurality of small uncoated glass beads are partially embedded in the upper surface thereof.

13. In a combined highway and surface marker comprising a road adapted to receive automative traffic, the upper surface of which is coated with a marking material, the improvement comprising a marking material comprising a transparent binder containing a plurality of daylight fluorescent pigment particles and a plurality of small opaque coated glass beads embedded therein, said coated glass beads having a relatively thin coating of a cured resin having a reflective pigment therein which renders the beads opaque and reflecting.

14. In a combined highway and surface marker in accordance with claim 13, wherein said marking material also contains a plurality of small uncoated glass beads therein.

15. In a combined highway and surface marker in accordance with claim 13 wherein said fluorescent pigment particles return an orange color in daylight and the pigment in the coated glass beads is yellow thereby reflecting a yellow return at night.

16. In a combined highway and surface marker in accordance with claim 13 wherein said glass beads have a cured coating thereon of a pigmented epoxy resin composition.

17. In a combined highway and surface marker in accordance with claim 13 wherein said glass beads have a cured coating thereon of a chrome yellow pigmented epoxy resin composition.

18. In a combined highway and surface marker in accordance with claim 13 wherein a plurality of small uncoated glass beads are partially embedded in the upper surface of said marking material.

19. In a combined highway and surface marker in accordance with claim 14 wherein a plurality of small uncoated glass beads are partially embedded in the upper surface of said marking material.

References Cited by the Examiner

UNITED STATES PATENTS

| | | | |
|---|---|---|---|
| 2,379,741 | 7/1945 | Palmquist | 88—62 |
| 2,490,091 | 12/1949 | Reardon | 250—71 |
| 2,644,890 | 7/1953 | Hallihan | 250—71 |
| 2,952,192 | 9/1960 | Nagin | 117—33.5 |
| 3,030,870 | 4/1962 | Gill | 117—33.5 |

RALPH G. NILSON, *Primary Examiner.*

JAMES W. LAWRENCE, *Examiner.*